(12) United States Patent
Scott

(10) Patent No.: US 8,770,269 B2
(45) Date of Patent: Jul. 8, 2014

(54) THREE PHASE FIN SURFACE COOLER

(75) Inventor: David Russell Scott, Walsall (GB)

(73) Assignee: HS Marston Aerospace Ltd. (GB)

( * ) Notice: Subject to any disclaimer, the term of this patent is extended or adjusted under 35 U.S.C. 154(b) by 1043 days.

(21) Appl. No.: 12/813,963

(22) Filed: Jun. 11, 2010

(65) Prior Publication Data

US 2011/0303405 A1    Dec. 15, 2011

(51) Int. Cl.
*F28D 7/02* (2006.01)
*F01M 5/00* (2006.01)

(52) U.S. Cl.
USPC ........................................ 165/164; 165/185

(58) Field of Classification Search
USPC ................ 165/185, 164, 165, 167, 179, 916; 184/104.1
See application file for complete search history.

(56) References Cited

U.S. PATENT DOCUMENTS

| | | | |
|---|---|---|---|
| 2,577,188 A * | 12/1951 | Hall | 184/106 |
| 3,610,334 A * | 10/1971 | Sletten | 165/164 |
| 3,817,354 A * | 6/1974 | Meiners | 184/104.3 |
| 3,837,395 A | 9/1974 | Coolidge | |
| 4,022,272 A * | 5/1977 | Miller | 165/51 |
| 5,189,929 A | 3/1993 | Chory | |
| 5,445,861 A | 8/1995 | Newton et al. | |
| 5,655,361 A | 8/1997 | Kishi | |
| 5,709,263 A | 1/1998 | Mira | |
| 6,058,696 A | 5/2000 | Nikkanen et al. | |
| 6,106,229 A | 8/2000 | Nikkanen et al. | |
| 6,173,493 B1 * | 1/2001 | Dierbeck | 29/890.043 |
| 6,973,790 B2 | 12/2005 | Suenaga et al. | |
| 7,311,175 B2 | 12/2007 | Proscia et al. | |
| 7,401,682 B2 | 7/2008 | Proscia et al. | |
| 7,578,369 B2 | 8/2009 | Francisco et al. | |
| 8,291,965 B2 * | 10/2012 | Wayman | 165/80.3 |
| 2008/0095611 A1 | 4/2008 | Storage et al. | |
| 2008/0096451 A1 | 4/2008 | Haerle | |
| 2008/0264616 A1 | 10/2008 | Deschodt et al. | |
| 2009/0317238 A1 | 12/2009 | Wood et al. | |
| 2010/0065366 A1 | 3/2010 | Soltau et al. | |
| 2010/0139900 A1 | 6/2010 | Thompson | |
| 2011/0126544 A1 | 6/2011 | Foster | |

FOREIGN PATENT DOCUMENTS

| | | |
|---|---|---|
| DE | 1167557 A | 10/1969 |
| EP | 2206893 A2 | 7/2010 |
| JP | 4190094 A | 7/1992 |
| JP | 7161889 A | 6/1995 |
| JP | 2005327795 A | 11/2005 |
| JP | 2008144752 A | 6/2008 |
| JP | 2008235387 A | 10/2008 |

OTHER PUBLICATIONS

Combined Search and Examination Report for GB Application No. 1109643.5, dated Sep. 30, 2011, pp. 1-5.
Combined Examination and Search Report No. GB1109642.7 dated Sep. 28, 2011.
Japanese Office Action dated Oct. 16, 2012 for corresponding Application No. 2011-125941, 7 pages.

* cited by examiner

*Primary Examiner* — Tho V Duong
(74) *Attorney, Agent, or Firm* — Cantor Colburn LLP

(57) ABSTRACT

A surface cooler is provided and includes an oil layer, through which oil flows, a separating plate disposed in heat transfer communication with the oil and fins extending into an air flow pathway and being disposed in heat transfer communication with the separating plate, the fins being arranged with varied configurations at each of two or more sections sequentially defined along a predominant direction of air flow along the air flow pathway.

13 Claims, 2 Drawing Sheets

THREE PHASE FIN SURFACE COOLER

BACKGROUND OF THE INVENTION

The subject matter disclosed herein relates to a surface cooler.

Typically, a surface cooler is installed in a wall of an aero engine turbofan bypass duct. Normally, the surface cooler is used to cool engine oil but can be used for cooling other fluids. This oil travels through an oil layer and secondary surface fins directly above the oil layer protrude into airflow moving through the bypass duct. The heat transfer between the airflow and the secondary surface fins leads to heat removal from the hot oil through a flat primary surface separating plate to which the secondary surface fins are connected and the secondary surface fins.

In general, the secondary surface fins have the same cross-sectional profile from front to back even though, in practice, the fins must serve different functions at different points. For example, the front section of fins must withstand impacts from foreign objects travelling through the bypass duct (e.g., hail), the middle section of fins must offer a high degree of thermal performance and the back section of fins must create smooth flow to minimise a wake produced by the surface cooler.

BRIEF DESCRIPTION OF THE INVENTION

According to one aspect of the invention, a surface cooler is provided and includes an oil layer, through which oil flows, a separating plate disposed in heat transfer communication with the oil and fins extending into an air flow pathway and being disposed in heat transfer communication with the separating plate, the fins being arranged with varied configurations at each of two or more sections sequentially defined along a predominant direction of air flow along the air flow pathway.

According to another aspect of the invention, a surface cooler is provided and includes an oil layer, through which oil flows, a separating plate disposed in heat transfer communication with the oil and fins extending into an air flow pathway and being disposed in heat transfer communication with the separating plate, a leading section of the fins having a first thickness, being substantially straight and being arranged with a sloped leading end, a rear section of the fins having a second thickness, which is thinner than the first thickness, being substantially straight and being arranged with a sloped rear end, and an intermediate section of the fins being arranged between the leading and rear sections with a repeating pattern of high thermal performance shapes.

According to another aspect of the invention, a method of forming a surface cooler, including an oil layer, through which oil flows, and a separating plate disposed in heat transfer communication with the oil is provided and includes fashioning patterns with substantially straight fin profiles having a first thickness at a leading section, substantially straight fin profiles having a second thickness, which is thinner than the first thickness, at a rear section and a repeating pattern of high thermal performance shaped fin profiles at an intermediate section, stacking and joining laminates reflective of the patterns onto the separating plate to form substantially straight leading section fins having the first thickness, substantially straight rear section fins having the second thickness and a repeating pattern of intermediate section high thermal performance shaped fins and machining the leading and rear section fins to form sloped leading and rear ends.

These and other advantages and features will become more apparent from the following description taken in conjunction with the drawings.

BRIEF DESCRIPTION OF THE DRAWING

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
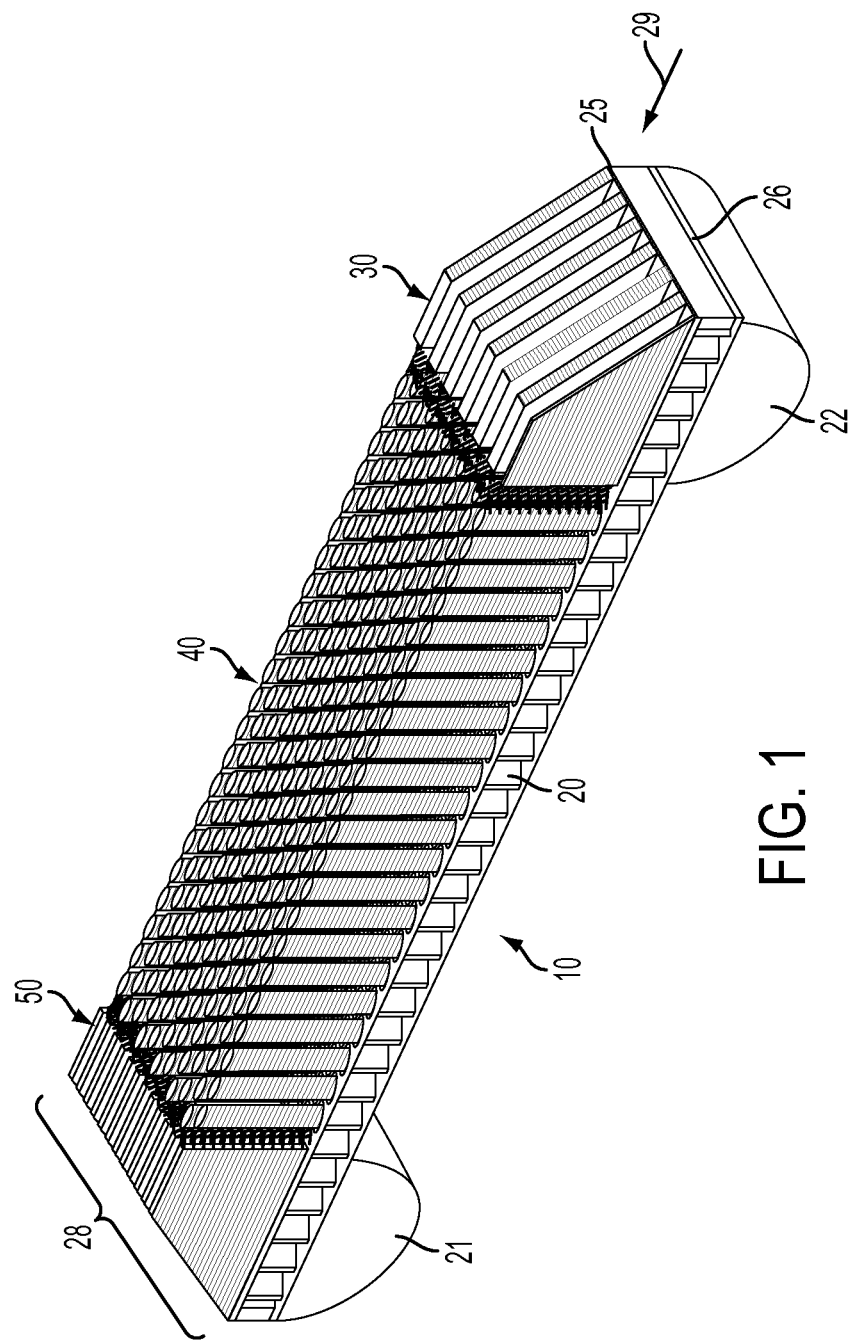
FIG. 1 is a perspective sectional view of a surface cooler.
Figure 2:
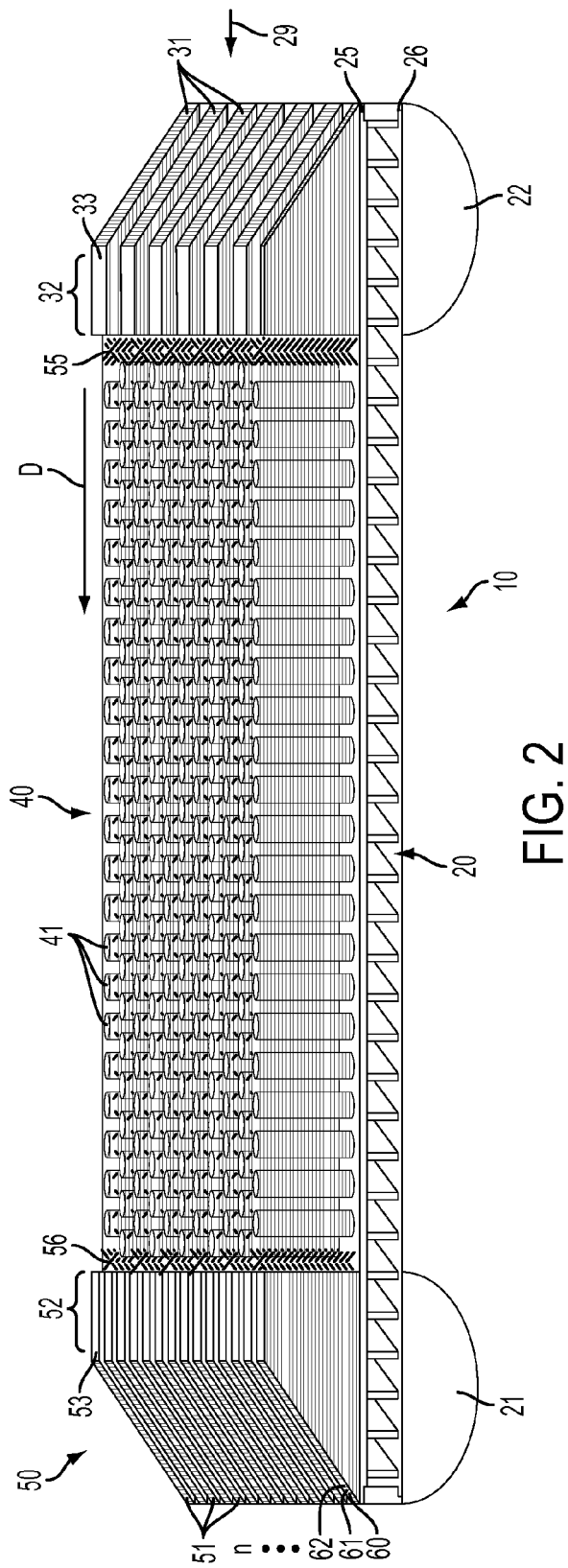
FIG. 2 is a side sectional view of the surface cooler of FIG. 1.

With reference to FIGS. 1 and 2, a shape of secondary surface fins (hereinafter "fins") varies at various surface cooler sections to achieve performance goals for each section. As shown, a surface cooler 10 is provided and includes an oil layer 20, through which oil flows from, for example, a first plenum 21 to a second plenum 22 via multiple pathways, and a separating plate 25 disposed in heat transfer communication with the oil, which delimits along with separating plate 26 first and second sides of the oil layer 20.

The surface cooler 10 further includes fins 28. The fins 28 extend into an air flow pathway, which is generally defined proximate to the first side of the oil layer 20, along which cool air 29 flows. The fins 28 are disposed in contact with and, therefore, in heat transfer communication with the separating plate 25 such that heat transfer between the fins 28 and the cool air 29 leads to heat removal from the oil. The fins 28 are arranged with varied configurations at each of two or more sections that are sequentially defined along a predominant direction, D, of the flow of the cool air 29 along the air flow pathway. The two or more sections may include a leading section 30, a rear section 50 and an intermediate section 40, which is interposed between the leading section 30 and the rear section 50.

The fins 28 at the leading section 30 have a first thickness and are formed to include a sloped leading end 31. In this way, the fins 28 at the leading section are able to withstand impacts with particulate matter carried by the cool air 29. At a rearward portion 32 of the leading section 30, the fins 28 are formed to include a flat top surface 33.

The fins 28 at the intermediate section 40 are formed with a repeating pattern of, for example, thermally efficient or high thermal performance shapes, such as ellipses 41, tear drops, aerofoils or wavy herringbone fin shapes. As such, the intermediate section 40 has a high characteristic degree of heat transfer between the fins 28 and the cool air 29. Thus, much of the heat removed from the oil is removed as the oil passes near the intermediate section 40.

The fins 28 at the rear section 50 have a second thickness, which may be thinner than the first thickness, such that the fins 28 at the rear section 50 are thin as compared to the fins 28 at the leading section 30. The fins 28 at the rear section 50 are also formed to include a sloped rear end 51. In this way, a relatively smooth flow of the cool air 29 may be generated and a wake produced by the surface cooler 10 may be reduced. At a forward portion 52 of the rear section 50, the fins 28 are formed to include a flat top surface 53 similar to flat top surface 33, where both flat top surfaces 33 and 53 have a similar height relative to the separating plate 25 as the tops of the fins 28 at the intermediate section 40.

The fins 28 are further formed to define first and second transition zones 55 and 56 between the leading and intermediate sections 30 and 40 and between the intermediate and rear sections 40 and 50. Here, in an exemplary configuration, the fins 28 are formed in a predefined pattern, such as a crisscross pattern, an in-line pattern or a similar pattern.

In accordance with another aspect of the invention, a method of forming a surface cooler 10 is provided. As described above, the surface cooler 10 includes an oil layer 20, through which oil flows, and a separating plate 25 disposed in heat transfer communication with the oil. The method includes fashioning patterns with substantially straight fin profiles having the first thickness at a leading section 30, substantially straight fin profiles having the second thickness at a rear section 50 and a repeating pattern of elliptical fin profiles at an intermediate section 40. Laminates 60, 61, 62, . . . n that are reflective of the patterns are then stacked onto the separating plate 25 and joined together to form fins 28, which have the first thickness and which are substantially straight at the leading section 30, fins 28, which have the second thickness and which are substantially straight at the rear section 50, and fins 28, which are arranged in a repeating pattern of ellipses at the intermediate section 40. At this point, the fins 28 at the leading and rear sections 30 and 50 are machined to form sloped leading and rear ends 31 and 51 although it is understood that the slopes could be formed in other ways, such as being formed into the patterns themselves.

The fashioning may include fashioning first and second patterns, for example, whereby the laminates 60, 61, 62, . . . n reflective of each can be alternately stacked onto the separating plate 25. The joining of the laminates 60, 61, 62, . . . n may include at least one of brazing and diffusion bonding or any other similar process.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A surface cooler, comprising:
an oil layer, through which oil flows;
a separating plate disposed in heat transfer communication with the oil; and
fins extending into an air flow pathway and being disposed in heat transfer communication with the separating plate, the fins being arranged with varied configurations at each of two or more sections sequentially defined along a predominant direction of air flow along the air flow pathway,
the two or more sections comprising a leading section, a rear section and an intermediate section interposed between the leading and rear sections,
the fins at the leading and rear sections comprising sloped leading and trailing ends, respectively, the sloped leading and trailing ends including slopes transverse to a plane of the separating plate that begin to protrude from and terminate at the plane of the separating plate, respectively, wherein the fins at the leading section are thicker than the fins at the rear section.

2. The surface cooler according to claim 1, wherein the fins at a rearward portion of the leading section comprise a flat top surface.

3. The surface cooler according to claim 1, wherein the fins at the intermediate section are formed with a repeating pattern.

4. The surface cooler according to claim 1, wherein fins at the intermediate section have thermally efficient shapes.

5. The surface cooler according to claim 1, wherein the fins at the intermediate section have high thermal performance shapes.

6. The surface cooler according to claim 1, wherein the fins at the rear section comprise a sloped rear end.

7. The surface cooler according to claim 6, wherein the fins at a forward portion of the rear section comprise a flat top surface.

8. A surface cooler, comprising:
an oil layer, through which oil flows;
a separating plate disposed in heat transfer communication with the oil; and
fins extending into an air flow pathway and being disposed in heat transfer communication with the separating plate, the fins being arranged with varied configurations at each of two or more sections sequentially defined along a predominant direction of air flow along the air flow pathway,
wherein the two or more sections comprise a leading section, a rear section and an intermediate section interposed between the leading and rear sections, and
wherein the fins at the leading section are thicker than the fins at the rear section.

9. The surface cooler according to claim 1, wherein the fins at the leading and rear sections are substantially straight.

10. The surface cooler according to claim 1, wherein the fins are formed to define first and second transition zones between the leading and intermediate sections and between the intermediate and rear sections.

11. The surface cooler according to claim 10, wherein the fins are formed in a predefined pattern at the first and second transition zones.

12. A surface cooler, comprising:
an oil layer, through which oil flows;
a separating plate disposed in heat transfer communication with the oil; and
fins extending into an air flow pathway and being disposed in heat transfer communication with the separating plate,
a leading section of the fins having a first thickness, being substantially straight and being arranged with a sloped leading end,
a rear section of the fins having a second thickness, which is thinner than the first thickness, being substantially straight and being arranged with a sloped rear end, and
an intermediate section of the fins being arranged between the leading and rear sections with a repeating pattern of high thermal performance shapes.

13. The surface cooler according to claim 12, wherein the fins at the leading section comprise a flat top surface rearward of the leading end and the fins at the rear section comprise a flat top surface forward of the rear end.

* * * * *